United States Patent [19]

Liguore

[11] Patent Number: 5,127,275
[45] Date of Patent: Jul. 7, 1992

[54] IN-LINE LOAD CELL FOR FLEXIBLE STRENGTH MEMBER MATERIALS

[75] Inventor: Joseph Liguore, Ledyard, Conn.

[73] Assignee: The United States of America as represented by the Secretary of the Navy, Washington, D.C.

[21] Appl. No.: 573,971

[22] Filed: Aug. 27, 1990

[51] Int. Cl.⁵ .............................................. G01L 5/10
[52] U.S. Cl. ................................. 73/862.39; 73/862.48
[58] Field of Search ............ 73/862.46, 862.47, 862.48, 73/862.39

[56] References Cited

U.S. PATENT DOCUMENTS 3,426,589  2/1969  Brendel ............................ 73/862.48
4,506,555  3/1985  McCubbin ........................ 73/862.46

Primary Examiner—Charles A. Ruehl
Attorney, Agent, or Firm—Michael J. McGowan; Prithvi C. Lall; Michael F. Oglo

[57] ABSTRACT

An in-line load cell for flexible strength member materials. An aluminum cylindrical body section houses two steel pins that perpendicularly pass through the longitudinal axis of the body section. Both steel pins extend from either side of the body section to provide four wrapping points for a flexible strength member to be tested. The load cell is placed in the line of action of the strength member and the strength member is wrapped about the four wrapping points. The forces exerted on the wrapping points cause bending moments to occur around the steel pins as tension is applied throughout the strength member. A strain gauge mounted on the body section between the two steel pins measures the tension in the flexible member based on the tensile strain in the body section.

6 Claims, 1 Drawing Sheet

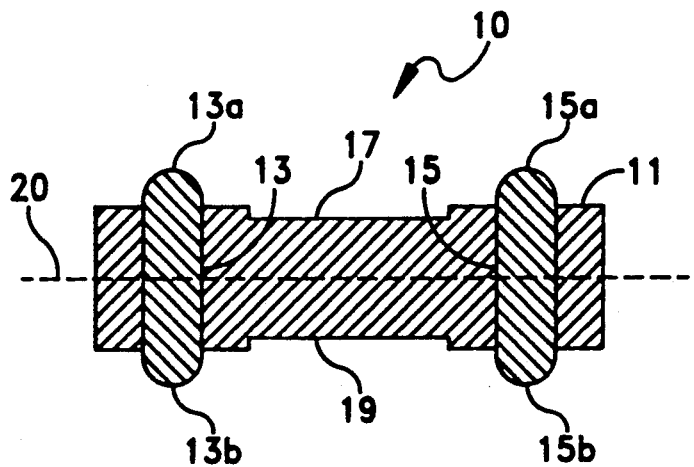
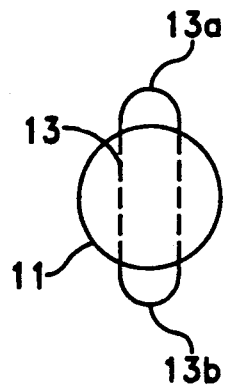
FIG. 1    FIG. 2
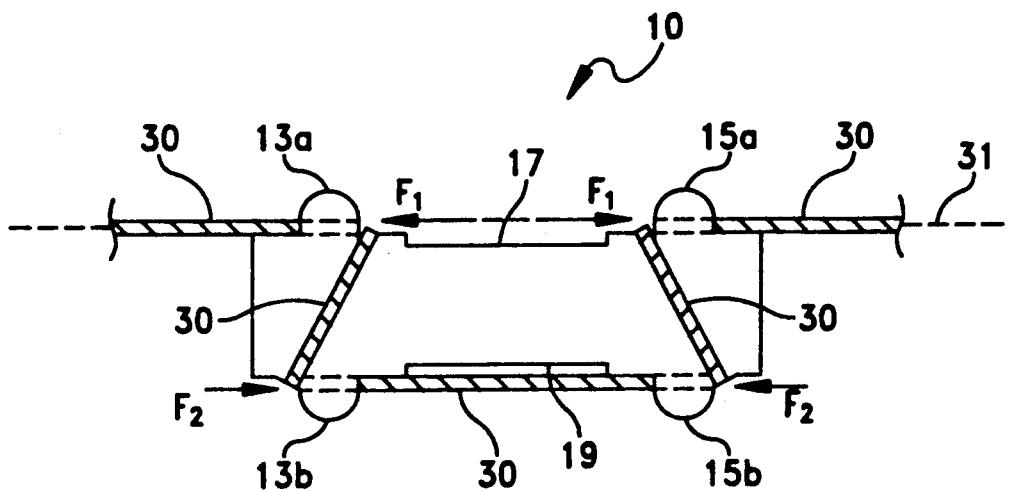
FIG. 3
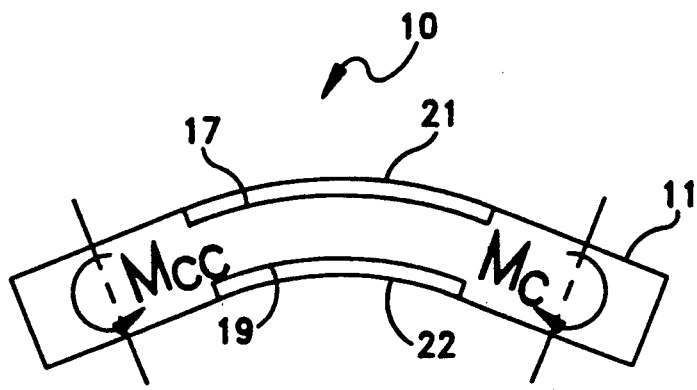
FIG. 4

IN-LINE LOAD CELL FOR FLEXIBLE STRENGTH MEMBER MATERIALS

STATEMENT OF GOVERNMENT INTEREST

The invention described herein may be manufactured and used by or for the Government of the United States of America for Governmental purposes without the payment of any royalties thereon or therefore.

BACKGROUND OF THE INVENTION (1) Field of the Invention

The present invention generally relates to load cells and more particularly to an in-line load cell for measuring in-line tension for flexible strength member materials.

(2) Description of the Prior Art

As materials technology has improved over the years, flexible strength members such as Kevlar and Dacron have replaced rigid strength members such as standard steel cables. It is naturally desirable to accurately measure "in-line" tension in the flexible strength members. "In-line" tension is defined as tension in the same line of action as the strength member away from the member's end. Unfortunately, in-line load cells that are currently used to measure strength of these members require interruption of the line of action through termination of the strands to either end of the load cell.

SUMMARY OF THE INVENTION

Accordingly, it is an object of the present invention to provide an in-line load cell for flexible strength member materials that measures tension in the strength member's line of action.

It is a further object of the present invention to provide an in-line load cell for flexible strength member materials that does not require termination of the strength member.

Other objects and advantages of the present invention will become more apparent hereinafter in the specification and drawings.

In accordance with the present invention, an in-line load cell has been designed for measuring tension in a flexible strength member. An aluminum cylindrical body section houses two steel pins that perpendicularly pass through the longitudinal axis of the body section at opposite ends of the body section. Both steel pins extend from either side of the body section thereby providing four wrapping points for the flexible strength member. The flexible strength member is then wrapped around the four wrapping points such that a counter clockwise bending moment is created about one steel pin and a clockwise bending moment is created about the other steel pin as tension is applied throughout the strength member. A strain gauge mounted on the body section between the two steel pins is used to measure in-line tension in the strength member based upon tensile strain in the body section caused by the bending moments.

BRIEF DESCRIPTION OF THE DRAWINGS

FIG. 1 is a cross-sectional, side-view of the in-line load cell according to the present invention;

FIG. 2 is an end-view of the in-line load cell according to the present invention;

FIG. 3 is a side-view of the in-line load cell that has been placed in the line of action of a flexible strength member; and FIG. 4 is a force diagram depicting the resulting bending moments created about the wrapping pins when load tension is applied throughout the flexible strength member of FIG. 3.

DESCRIPTION OF THE PREFERRED EMBODIMENT

Referring now to the drawings, and in particular to FIG. 1 a cross-sectional, side-view is shown of the in-line load cell 10 according to the present invention. Load cell 10 consists of a body section 11 and two pins 13 and 15 that pass through and extend beyond the body section 11. Typically, body section 11 is a solid cylinder of aluminum having two machined flat sections 17 and 19 between pins 13 and 15 for the mounting of strain gauges. The round shape of body section 11 provides a smooth surface to preclude damaging of the strength member to be tested. Aluminum is chosen for its strength, modulus of elasticity and bondability. However, other materials could be used such as mild or stainless steels. In fact, any material may be used for body section 11 that has: 1) strength properties that would preclude yielding, 2) enough elasticity to allow elongation of body section 11, 3) hardness properties sufficient to prevent damage to body section 11, and 4) sufficient bondability qualities so that the strain gauges may be properly mounted.

Body section 11 has a longitudinal axis designated by dash line 20. As shown in the end-view of FIG. 2, pin 13 perpendicularly passes through longitudinal axis 20 and extends from body section 11 on one side to form wrapping pin 13a and on the other side to form wrapping pin 13b. Similarly, although not shown in Fig. pin 15 extends from body section 11 on one side to form wrapping pin 15a and on the other side to form wrapping pin 15b. Both pins 13 and 15 are solid cylindrical pins having rounded ends and are typically made of high strength steel. The round shape of the pins provide smooth surfaces to preclude damaging the strength member to be tested. High strength steel is chosen for its strength and hardness properties. Other types of steel or other materials may be chosen which can support induced loading without failure.

In operation, the in-line load cell 10 is placed in a line of action 31 of a flexible strength member 30 which is wrapped about load cell 10 as shown in FIG. 3. The geometry of load cell 10 described above allows strength member 30 to be wrapped so as not to interrupt the line of action 31 of the strength member 30. A loosely fitted tie-strap (not shown) may be used to keep strength member 30 attached to the load cell 10 during relaxed conditions. As load tension is applied throughout strength member 30, forces $F_1$ are exerted by strength member 30 on wrapping pins 13a and 15a. Forces $F_2$ are exerted on wrapping pins 13b and 15b. Forces $F_1$ and $F_2$ cause equal and opposite bending moments $M_{cc}$ in a counter clockwise and $M_c$ in a clockwise direction as shown in FIG. 4.

The opposing action of bending moments $M_{cc}$ and $M_c$ exerted on pins 13 and 15 cause tensile strain (positive elongation of body section 11) on one side of body section 11. The tensile strain is measured by a strain gauge 21 mounted on section 17 of body section 11 between wrapping pins 13a and 15a. In addition, bending moments $M_{cc}$ and $M_c$ cause compression strain (negative elongation of body section 11) on other side of body section 11 between wrapping pins 13b and 15b. This compression strain could likewise be measured by mounting a second strain gauge 22 on section 19 of body section 11. Both the tensile strain and compression strain are linear with respect to the applied load tension within the flexible strength member 30.

The advantages of the present invention are numerous. The in-line load cell is a small, light-weight device that mounts in-line with out permanently deforming and/or damaging the strength member under test. Furthermore, the size and weight of the device make it available for use in situations where space is limited.

The in-line load cell of the present invention may be manufactured in various materials, shapes and sizes. The dimensions of the body section and pins will depend upon the maximum load requirement and characteristics of the flexible strength member to be tested. The strain gauge(s) may be mounted and epoxied onto the body section such that a smooth cylindrical shape is obtained as a finished product. Also, electrical connection to the strain gauge(s) may pass through the body section via a smooth tapered wiring jacket. Thus, it will be understood the various changes in details, materials, steps and arrangement of parts, which have been herein described and illustrated in order to explain the nature of the invention, may be made by those skilled in the art within the principle and scope of the invention as expressed in the appended claims.

What is claimed is:

1. An apparatus for measuring in-line tension in a flexible strength member, comprising:
   a body section having a longitudinal axis;
   a first wrapping pin extending from said body section and having a longitudinal axis perpendicularly passing through said body section longitudinal axis;
   a second wrapping pin rigidly connected to and having a longitudinal axis in common with said first wrapping pin, said second wrapping pin extending from said body section at an angle of 180° with respect to said first wrapping pin;
   a third wrapping pin having a longitudinal axis parallel to and a distance from said longitudinal axis of said first and second pins and perpendicularly passing through said body section longitudinal axis, said distance being measured along said body section longitudinal axis; and
   a fourth wrapping pin rigidly connected to and having a longitudinal axis in common with said third wrapping pin, said fourth wrapping pin extending from said body section at an angle of 180° with respect to said third wrapping pin wherein said flexible strength member is wrapped about said first, second, third and fourth wrapping pins such that when the flexible strength member is under load tension, a counter clockwise bending moment is created about said longitudinal axis of said first and second pins and a clockwise bending moment is created about said longitudinal axis of said third and fourth pins, whereby in-line tension is measured: 1) by a first strain gauge responsive to tensile strain mounted on said body section between said first and third pins, and 2) by a second strain gauge responsive to compressive strain mounted on said body section between said second and fourth pins.

2. An apparatus as in claim 1 wherein said body section comprises a solid cylinder about its longitudinal axis.

3. An apparatus as in claim 1 wherein said body section is comprised of aluminum.

4. An apparatus as in claim 1 wherein said first and second wrapping pins comprise a first solid pin and wherein said third and fourth pins comprise a second solid pin.

5. An apparatus as in claim 1 wherein said first, second, third and fourth wrapping pins are comprised of steel.

6. An apparatus for measuring in-line tension in a flexible strength member, comprising:
   a first body section having a longitudinal axis;
   a first wrapping pin housed within said first body section and perpendicularly passing through said longitudinal axis, said first wrapping pin further extending beyond said first body section;
   a second body section rigidly connected to and having a longitudinal axis in common with said first body section longitudinal axis;
   a second wrapping pin housed within said second body section and perpendicularly passing through said longitudinal axis, said second wrapping pin further extending beyond said second body section; and
   a third body section having a longitudinal axis in common with said first and second body section's longitudinal axis for fixably connecting said first body section to said second body section wherein said flexible strength member is wrapped about said first and second wrapping pins such that said third body section bends when said flexible strength member is under load tension, said bending simultaneously causing tension in a first side of said third body section and compression in a second side of said third body section, said second side being opposite of said first side, whereby said in-line tension is measured: 1) by a first strain gauge responsive to tensile strain mounted to said first side, and 2) by a second strain gauge responsive to compressive strain mounted to said second side.

* * * * *